April 24, 1934.  J. G. OETZEL  1,956,247
APPARATUS FOR TESTING SPRAY JETS OF DIESEL ENGINES
Filed March 11, 1931  4 Sheets-Sheet 1
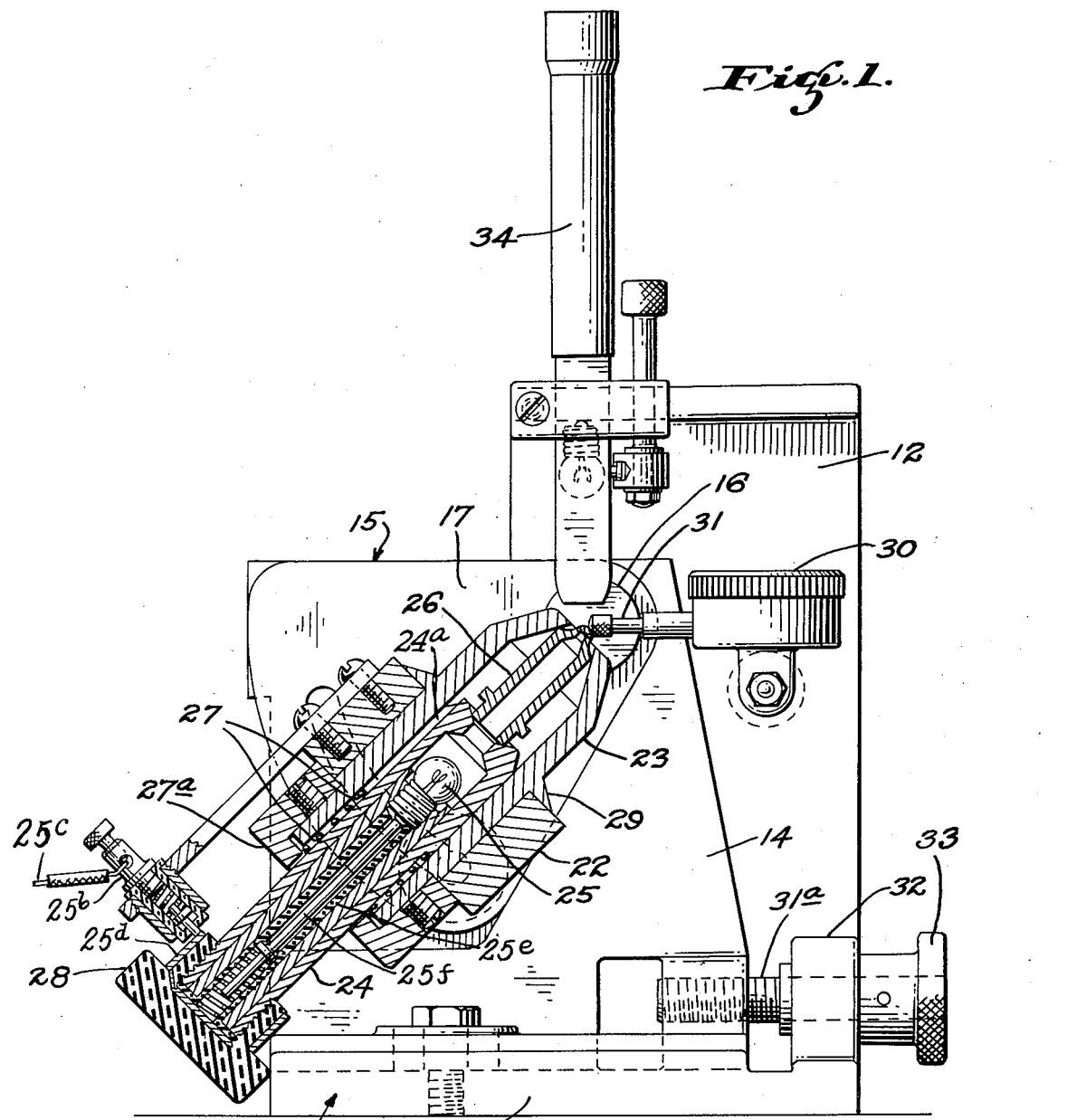

April 24, 1934.  J. G. OETZEL  1,956,247
APPARATUS FOR TESTING SPRAY JETS OF DIESEL ENGINES
Filed March 11, 1931  4 Sheets-Sheet 2
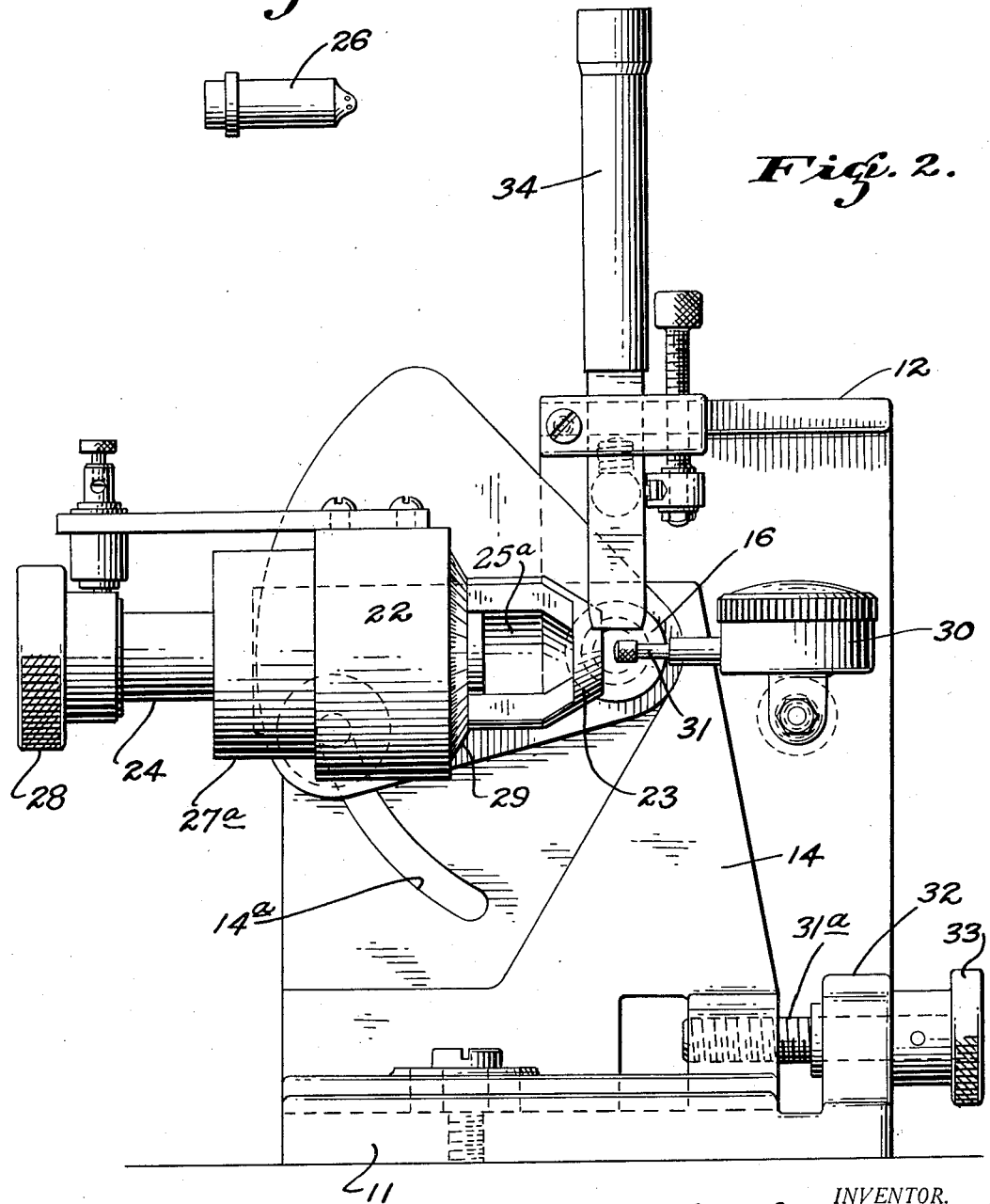

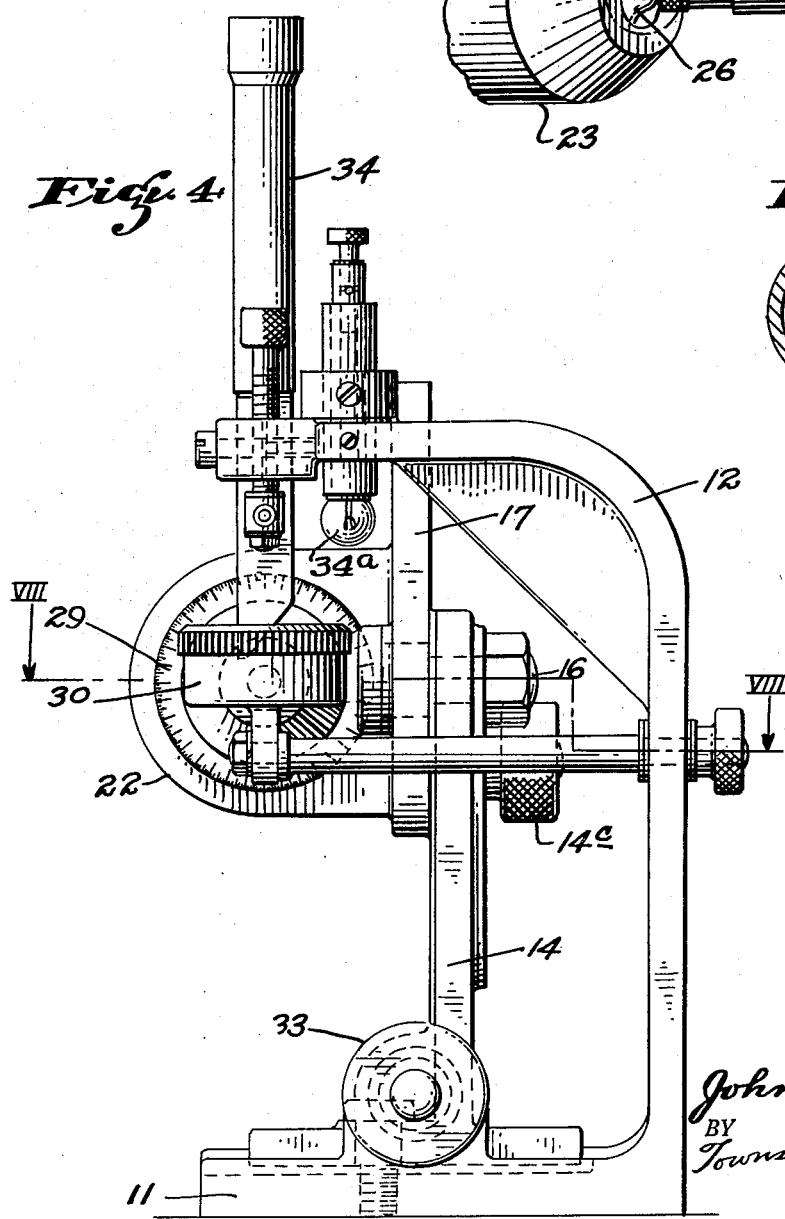

April 24, 1934.  J. G. OETZEL  1,956,247
APPARATUS FOR TESTING SPRAY JETS OF DIESEL ENGINES
Filed March 11, 1931  4 Sheets-Sheet 4
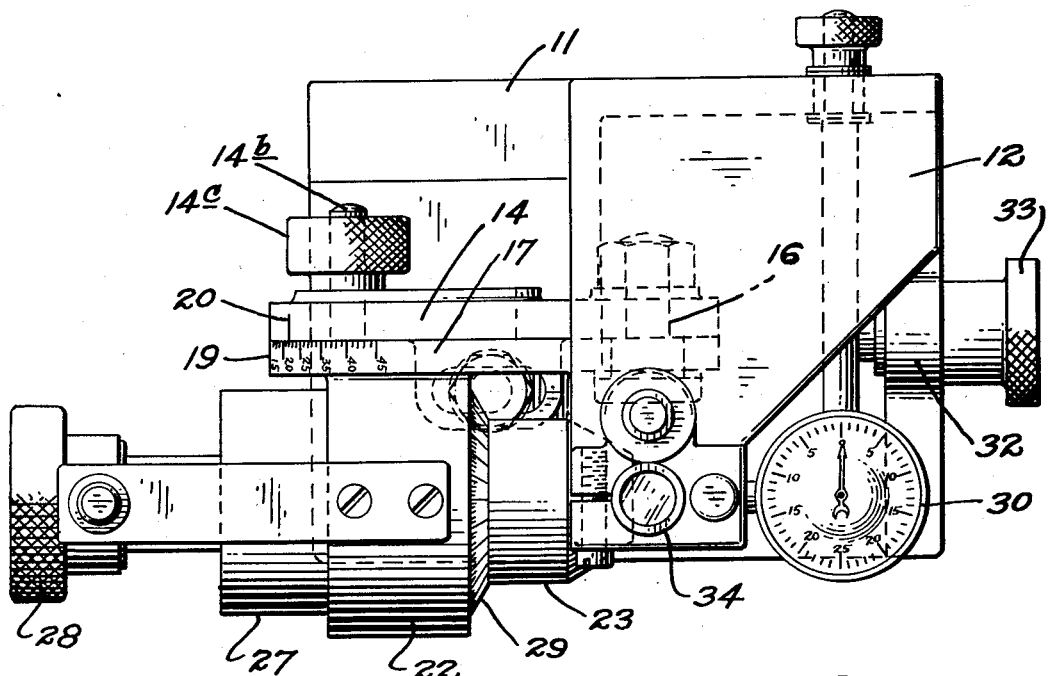
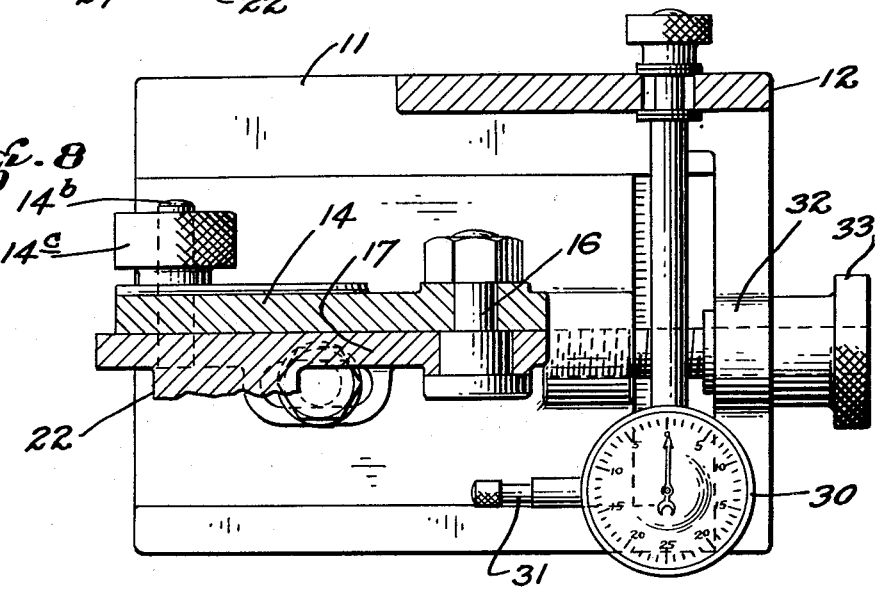
INVENTOR.
John George Oetzel.
BY Townsend, Loftus & Ablett
ATTORNEYS.

Patented Apr. 24, 1934

1,956,247

UNITED STATES PATENT OFFICE 1,956,247

APPARATUS FOR TESTING SPRAY JETS OF DIESEL ENGINES

John George Oetzel, Alameda, Calif., assignor to Atlas Imperial Diesel Engine Company, Oakland, Calif., a corporation of California Application March 11, 1931, Serial No. 521,809

6 Claims. (Cl. 33—174)

This invention relates to testing appliances and particularly pertains to an apparatus for testing the jets of spray nozzles used in Diesel engines.

It is the principal object of the present invention to provide a simple and efficient apparatus capable of use in expeditiously testing spray nozzles to accurately determine the diameter, angular disposition and spacing of the jets thereof.

In carrying the invention into practice I provide an apparatus including a nozzle mounting for receiving a spray nozzle. This apparatus is fitted with a microscope and measuring instruments which are so relatively positioned that by manipulation of the nozzle through the medium of the holder relative to the instruments the diameter of the jets, their angular disposition relative to the axis of the nozzle and the spacing between the jets can be accurately and quickly determined.

One form which the invention may assume is exemplified in the following description and illustrated by way of example in the accompanying drawings, in which:

Fig. 1 is a view in side elevation of a testing appliance embodying the preferred form of my invention with parts thereof in section so as to more clearly disclose certain features of the invention.

Fig. 2 is a side elevation of the device.

Fig. 3 is a view of the nozzle to be tested in this apparatus.

Fig. 4 is an end elevation of the apparatus.

Fig. 5 is a fragmentary view showing the dial gage in plan and the manner in which it is engaged by the nozzle.

Fig. 6 is a view in transverse section through the microscope showing the disposition of the cross hairs on the lens.

Fig. 7 is a view in plan of the apparatus.

Fig. 8 is a view in plan section of the apparatus on line VIII—VIII of Fig. 4 showing details of construction of certain parts and having other parts broken away.

The testing apparatus disclosed in the accompanying drawings comprises a main frame 10 of suitable design and construction. This main frame 10 includes a base 11, a microscope supporting arm 12 which overlies the base and a nozzle mounting support 14 which projects vertically from the base. This support 14 is slidably mounted on the base as will be hereinafter described. A nozzle mounting 15 is pivotally connected by means of a pivot pin 16 to the support 14 so that the mounting 15 may be oscillated in a vertical plane.

To control the oscillation of the nozzle mounting, the support 14 is provided with an arcuate slot 14a which is concentric to the axis of the pivot pin 16. A stud 14b is fixed in the nozzle mounting and projects through the slot. A knurled nut 14c is threaded on the projecting end of this stud 14b and may be used to clamp the nozzle mounting in any fixed position relative to the support 14. Upon release of this nut the nozzle mounting can, of course, be oscillated to the extent permitted by the length of the arcuate slot 14a.

The nozzle mounting 15 includes a flat plate 17 arranged parallel to and contiguous to the support 14 and it is to this plate that the stud 14b is secured. The pivot pin 16 is engaged both with the plate 17 and the support 14 so as to form the pivotal connection between the two parts. One marginal edge of the flat plate 17 is arcuate and is formed concentrically of the pivotal point of the nozzle mounting 15. This arcuate edge is calibrated in degrees as at 19, which calibrations cooperate with a fixed mark 20 on the contiguous edge of the support 14 so that the degree of movement of the nozzle mounting 15 in either direction about its pivotal point may be accurately determined.

Fixed to the flat plate 17 by being integrally cast, welded or otherwise suitably secured is a bearing 22 which rotatably receives a nozzle receiving cylinder 23. This cylinder is collared on the bearing so that it will be free to rotate but will be held against axial movement relative to the bearing 22. The axis of this cylinder is such that it will intersect the axis of the pivot pin 16 about which the mounting 15 oscillates. One end of this cylinder 23, or that end which is adjacent to the pivotal point of the mounting 15, is frusto-conical both in bore and exterior contour. This end of the cylinder is open as illustrated in Fig. 1.

Reciprocably mounted in the cylinder 23 is a spring-pressed plunger 24. The plunger 24 is prevented from rotating with relation to the cylinder 23 by means of a spline connection indicated at 24a. The end of this plunger which is within the cylinder has a frusto-conical bore which is opposed to the frusto-conical bore of the adjacent end of the cylinder. One side of the cylinder is apertured as shown at 25a in Fig. 2 so that a nozzle 26 may be inserted into the cylinder, one end engaging the end of the plunger and the opposite end engaging the conical bore of the cylinder. These conical portions of the cylinder and plunger will cooperate in automatically arranging the nozzle coaxially of the cylinder, with the tip of the nozzle projecting through the open end of the cylinder.

The plunger is hollow as illustrated and is fitted interiorly with a light bulb 25 which will illuminate the interior of the tip for the purpose of enabling the jets in the end of the nozzle to be visible for testing purposes. The bulb 25 is provided with an electrical circuit most clearly illustrated in Fig. 1, which circuit includes a contact member 25b which is stationarily held but insulated from the member 22. Current is led to the contact member 25b by a conductor 25c from a source of current supply. The contact member 25b slidably engages a conducting member 25d carried by the knurled knob 28 which is fitted to the outer end of the plunger 24. Arranged within the plunger 24 is an insulating tube 25e and mounted within this tube is a conductor member 25f which is in electrical engagement at one end with the conducting member 25d and which is spring-pressed into engagement at the other end with one terminal of the bulb 25. Engagement of the shank of the bulb with the plunger 24, of course, grounds the other side of the bulb, so that the current is led from the conductor 25c to the conducting member 25d, thence to the conducting member 25f to the bulb and through the bulb to the ground.

The outer end of the plunger 24 is fitted with the knurled knob 28 for the purpose of rotating the plunger and the cylinder in unison within the bearing 22. Such rotation will, of course, be accompanied by rotation of the nozzle about its longitudinal axis.

It will be noticed from Fig. 1 that a spring 27 circumscribes the plunger within the cylinder 23 and is interposed between a collar 27a on one end of the cylinder 23 and a shoulder on the plunger. This spring tends to constantly urge the plunger toward the tapered end of the cylinder so that when a nozzle is inserted within the cylinder the plunger will act to tightly maintain the nozzle in proper position for testing.

In order to accurately determine the amount of rotation of the cylinder from any given starting point, the cylinder is formed with a circular dial 29 which is calibrated in degrees, which calibrations cooperate with a fixed mark 29a on the adjacent surface of the bearing 22. This enables any given amount of rotation of the cylinder and, of course, the nozzle supported therein to be accurately determined.

Adjustably mounted on the frame is a dial gage 30 having a spindle 31 projecting toward the tapered end of the cylinder 23. This spindle is so disposed that its extremity will engage the tip of a nozzle mounted in the cylinder for testing. When the nozzle mounting 15 is arranged so that the axis of a nozzle supported therein is disposed perfectly horizontal as in Fig. 2, the axis of the spindle 31 and the axis of the nozzle will be in absolute alignment.

In order to utilize the dial gage 30, the support 14 is movable in a direction parallel to the axis of the spindle 31. To impart movement to the support 14, I provide a feed screw 31a which is collared in a bearing 32 formed as part of the frame 10. The inner end of this feed screw threadedly engages a portion of the support 14 so that rotation of the feed screw will advance or retract the support 14 toward or away from the spindle 31 depending upon the direction of rotation, the support 14 being mounted as shown for sliding movement in a recessed portion of the base 11. To revolve the feed screw 31a, its outer end is fitted with a knurled knob 33. This knob may be manually manipulated to accomplish the desired result.

Arranged above the dial gage and nozzle mounting is a simple microscope 34 which is arranged vertically with its central longitudinal axis intersecting the axis of the spindle 31 and the axis of the cylinder 23. The lens of this microscope is formed with cross hairs, the point of intersection of the same being substantially at the axis of the microscope. This microscope is adjustably supported on the frame as illustrated in Figs. 1 and 2. A small light shown at 34a in Fig. 4 serves to illuminate the surface of the nozzle under the microscope for the purpose of improving visibility.

In operation, if it is desired to test the jets to determine their diameter, the nozzle mounting 15 is swung about its pivotal point until the jet to be measured is substantially in axial alignment with the microscope. During this time, of course, the tip of the nozzle will be in contact with the spindle 31 of the dial gage 30, it being placed in this position by manipulation of the support 14 through the medium of the feed screw 31a. The support 14 is then manipulated to place one cross hair on the lens through the center of the jet and the other cross hair in register with the side of the jet contiguous to the end of the spindle 31. The dial of the gage 30 is then manipulated to indicate zero. The feed screw 31a is then manipulated to move the support 14 toward the dial gage 30 until the cross hair registers with the opposite side of the jet. Thus, the spindle 31 will be moved axially a distance coinciding exactly with the diameter of the jet and, therefore, the dial gage will indicate in thousandths the jet diameter. By revolving the cylinder, the diameter of each jet may be measured successively.

In order to determine the angularity of the jets with respect to the longitudinal axis of the nozzle, it is merely necessary to swing the nozzle mounting about its pivotal point until the axis of the jet is in alignment with the axis of the microscope. This can be accurately determined due to the illumination of the jet making its inner wall visible and thus clearly showing whether or not the central axis of the jet is in line with the axis of the microscope. A reading may then be taken on the calibrations 19, which reading will indicate the degree of angularity of the jet relative to the longitudinal axis of the nozzle.

At the same time it can be determined whether or not the jet extends through the tip in a purely radial direction relative to a central point within the nozzle or whether it is disposed at an angle to a radius emanating from said central point. This can be accomplished by comparing the positions of the side walls of the jet with relation to the fixed point of intersection of the cross hairs when said fixed point is arranged in alignment with said central point within the nozzle.

In order to determine the spacing between the jets and the tip, the axis of one jet is aligned with the fixed point of intersection of the cross hairs with the jet substantially parallel to the axis of the microscope. The mounting is then fixed by manipulation of the knurled nut 14c. A reading is then taken on the dial 29 and the cylinder together with the nozzle is rotated until the succeeding jet aligns with the fixed point on the lens of the microscope. A reading is then again taken from the dial 29, which reading will indicate the degree of spacing between the jets. These operations may be repeated until the spacing between all the jets is determined.

From the foregoing it is obvious that I have provided a comparatively simple and inexpensive apparatus which may be used to expeditiously and accurately determine the diameter of the jets in a spray nozzle, their angularity with respect to the axis of the nozzle and the spacing between the jets.

It is also manifest that such an apparatus is very valuable for use not only in research work but in testing spray nozzles during the manufacture thereof so as to insure accuracy in production.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A testing apparatus of the character described comprising a dial gage having a spindle, means for supporting a spray nozzle in contact with the end of said spindle with the jet of the spray nozzle disposed with its axis at right angles to the line of movement of the spindle, a microscope mounted with its axis at right angles to the axis of the spindle and in alignment with the axs of the jet in the spray nozzle, said supporting means being capable of movement in a direction parallel to the axis of the spindle, said microscope permitting an accurate scrutiny of the spray nozzle and having a visible reference line on one lens thereof so that it may be moved relative to the spindle an amount agreeing with the diameter of the jet whereby the diameter of the jet will be indicated on the gage.

2. A testing apparatus of the character described comprising a microscope having a fixed point indicated on the lens thereof, means for receiving and supporting a spray nozzle with its jets adjacent the microscope, said means being capable of rotating the nozzle about its longitudinal axis to successively register the jets with the fixed point on the microscope, and calibrated means for indicating the degree of spacing between the jets successively registered with said fixed point, a dial gage arranged with its spindle in contact with the end of nozzle when it is disposed with one of its jets in alignment with the fixed point on the microscope, means for moving the jet transversely relative to the microscope and parallel to the axis of the spindle of the gage whereby said fixed point may be successively registered with opposite sides of the jet, the amount of movement causing such registration actuating the dial gage to indicate the diameter of the jet.

3. A testing apparatus of the character described comprising a microscope having a fixed point indicated on the lens thereof, means for receiving and supporting a spray nozzle with its jets adjacent the microscope, said means being capable of rotating the nozzle about its longitudinal axis to a successively register the jets with the fixed point on the microscope, calibrated means for indicating the degree of spacing between the jets successively registered with said fixed point, a dial gage arranged with the axis of its spindle intersecting the longitudinal axis of the microscope, means for moving said nozzle support in a direction parallel to the axis of said spindle, said spindle being adapted to contact with the end of the nozzle when said fixed point on the lens of the microscope registers with one side of a jet aligned with the microscope whereby movement of the jet transversely of the microscope until said fixed point registers with the opposite side of the jet will actuate the dial gage to indicate the diameter of the jet.

4. An apparatus of the character described comprising a microscope having a fixed point appropriately indicated on the lens substantially at the axis of the microscope, a nozzle supporting means capable of receiving and supporting a nozzle with its longitudinal axis intersecting the axis of the microscope, said nozzle supporting means being adapted to support a nozzle with a jet thereof visible through the microscope, means for rotating said nozzle supporting means whereby it may be utilized to rotate the nozzle supported therein about the longitudinal axis of the nozzle, calibrated means for indicating the rotation of said nozzle supporting means, means for oscillating said nozzle supporting means about an axis at right angles to the longitudinal axis of a nozzle supported therein, the axis about which said means oscillates intersecting the axis of the nozzle at the jet end of the nozzle, calibrated means to indicate the amount of oscillation of said nozzle supporting means.

5. An apparatus of the character described comprising a microscope having a fixed point appropriately indicated on the lens substantially at the axis of the microscope, a nozzle supporting means capable of receiving and supporting a nozzle with its longitudinal axis intersecting the axis of the microscope, said nozzle supporting means being adapted to support a nozzle with a jet thereof visible through the microscope, means for rotating said nozzle supporting means whereby it may be utilized to rotate the nozzle supported therein about the longitudinal axis of the nozzle, calibrated means for indicating the rotation of said nozzle supporting means, means for oscillating said nozzle supporting means about an axis at right angles to the longitudinal axis of a nozzle supported therein, the axis about which said means oscillates intersecting the axis of the nozzle at the jet end of the nozzle, calibrated means to indicate the amount of oscillation of said nozzle supporting means, and a source of light incorporated within said nozzle supporting means for illuminating the interior of the nozzle.

6. An apparatus of the character described comprising a microscope having a fixed point appropriately indicated on the lens substantially at the axis of the microscope, a nozzle supporting means capable of receiving and supporting a nozzle with its longitudinal axis intersecting the axis of the microscope, said nozzle supporting means being adapted to support a nozzle with a jet thereof visible through the microscope, means for rotating said nozzle supporting means whereby it may be utilized to rotate the nozzle supported therein about the longitudinal axis of the nozzle, calibrated means for indicating the rotation of said nozzle supporting means, means for oscillating said nozzle supporting means about an axis at right angles to the longitudinal axis of a nozzle supported therein, the axis about which said means oscillates intersecting the axis of the nozzle at the jet end of the nozzle, calibrated means to indicate the amount of oscillation of said nozzle supporting means, a dial gage having a spindle with its axis arranged at right angles to the axis of the microscope and intersecting the axis of the microscope whereby the end of the spindle may be placed in contact with the jet end of the nozzle, means for moving said nozzle supporting means in a direction parallel to the axis of the spindle whereby the sides of the jet may be successively registered with the fixed point on the lens of the microscope so as to impart an amount of movement to the spindle agreeing with the diameter of the jet whereby the diameter of the jet will be indicated on the dial gage.

JOHN GEORGE OETZEL.